United States Patent
Chien et al.

(10) Patent No.: US 8,180,170 B2
(45) Date of Patent: May 15, 2012

(54) APPARATUS AND METHOD OF RECOGNIZING IMAGE FEATURE PIXEL POINT

(75) Inventors: Chung-Fang Chien, Taipei (TW); Yu-Chen Huang, Jhudong Township, Hsinchu County (TW); Che-Hung Lin, Puli Township, Nantou County (TW)

(73) Assignee: Altek Corporation, Hsinchu (TW)

( * ) Notice: Subject to any disclaimer, the term of this patent is extended or adjusted under 35 U.S.C. 154(b) by 939 days.

(21) Appl. No.: 12/193,827

(22) Filed: Aug. 19, 2008

(65) Prior Publication Data
US 2009/0169107 A1    Jul. 2, 2009

(30) Foreign Application Priority Data
Dec. 31, 2007    (TW) ................................ 96151604 A

(51) Int. Cl.
*G06K 9/36*    (2006.01)

(52) U.S. Cl. ........................... 382/260; 382/264; 382/284
(58) Field of Classification Search .................. 382/284, 382/260, 264
See application file for complete search history.

(56) References Cited

U.S. PATENT DOCUMENTS
2004/0234157 A1 *  11/2004  Forman et al. ................ 382/260
* cited by examiner

*Primary Examiner* — Jon Chang
(74) *Attorney, Agent, or Firm* — Rabin & Berdo, P.C.

(57) ABSTRACT

An apparatus and a method of recognizing image feature pixels is related to the recognizing method including receiving an image having a plurality of pixels; subsequent filtering the pixels at least once by detecting the edge pixels of objects in the received image based on pixel values of the pixels, so as to obtain a plurality of candidate pixels; and performing multiple difference of Gaussian (DOG) blurring operations on the candidate pixels to find the candidate pixels having a relative extreme value as a plurality of feature pixels. Therefore, the processing time of recognizing image feature pixels may be reduced.

16 Claims, 7 Drawing Sheets

| P00 | P01 | P02 | P03 | P04 |
| --- | --- | --- | --- | --- |
| P10 | P11 | P12 | P13 | P14 |
| P20 | P21 | P22 | P23 | P24 |
| P30 | P31 | P32 | P33 | P34 |
| P40 | P41 | P42 | P43 | P44 |

FIG. 11

APPARATUS AND METHOD OF RECOGNIZING IMAGE FEATURE PIXEL POINT

CROSS-REFERENCE TO RELATED APPLICATIONS

This non-provisional application claims priority under 35 U.S.C. §119(a) on Patent Application No(s). 096151604 filed in Taiwan, R.O.C. on Dec. 31, 2007, the entire contents of which are hereby incorporated by reference.

BACKGROUND OF THE INVENTION

1. Field of Invention

The present invention relates to an image processing technology, and more particularly to an apparatus and a method of recognizing the feature pixels of an image.

2. Related Art

Virtual reality is a quite convenient visual communication tool. The virtual reality means establishing a new interface enabling users feel in a space of a computer simulation environment and move therein at will, so that the users may be personally on the scene.

Generally speaking, the scene of the virtual reality may be generated through two methods, one is to use three-dimensional (3D) objects to construct illusive scenes, and the other is panoramic image or panorama which is suitable for introducing a real scene. The panoramas mean the photos with an omni-directional scene or view of 360°. In brief, panoramic images or panoramas are made of stitching multiple images into single image with an omni-directional vista. For example, multiple images are shot in a center toward the surrounding with a fixed rotation angle and then stitched one by one using an image stitching technology, and furthermore, the two continuous images of the same scene are stitched seamlessly, thereby obtaining all-round panoramas.

Conventionally, feature pixels found in each image are used as reference to stitch images, and then the corresponding boundaries of stitched image are faded, thereby obtaining a seamless panorama.

In order to obtain better performance, multiple difference of Gaussian (DOG) blurring operations to find relative extreme values of images is often used to recognize objects or composite panoramas, and pixels with the relative extreme values found by multiple difference of Gaussian (DOG) blurring are considered as representative feature pixels of an image.

However, if a high resolution image (for example, more than 1 million pixels) is processed by using multiple difference of Gaussian (DOG) blurring operations, the operation process is usually too complicated and time-consuming. Especially, it is quite difficult to implement the difference of Gaussian (DOG) blurring function in an embedded system to deal with a high resolution image.

SUMMARY OF THE INVENTION

In view of the aforementioned problems, the present invention is mainly directed to provide an apparatus and a method to improve the performance of recognizing the feature pixels of an image, thereby solving the problem of time-consuming issue in the conventional art.

The method of recognizing image feature pixels provided by the present invention includes receiving an image having a plurality of pixels; finding the candidate pixels by using a filtering method at least once to detect the edge pixels of the objects in the received image; and performing difference of Gaussian (DOG) blurring operations on the candidate pixels to find the pixels with the relative extreme values as a plurality of feature pixels.

One filtering method includes: zooming out the image; sequentially calculating a plurality of gradient values related to each of the pixels in the zoomed-out image; obtaining the maximum gradient values among the gradient values related to each of the pixels; comparing each of the maximum gradient values with a threshold value, so as to obtain the pixels corresponding to the maximum gradient values larger than the threshold value; if the current filtering is the last one, using the obtained pixels as candidate pixels; and if the current filtering is not the last one, providing the obtained pixels for the next filtering. Moreover, after comparing each of the maximum gradient values with the threshold value, perform exclusion procedure to keep only one of the adjacently obtained pixels and eliminate other adjacent pixels.

The other filtering method includes: creating a window block by using one of the pixels in the image as a central point; calculating a mean of the pixel values in each window block; comparing the mean values of each window block and picking up the central pixels of the windows blocks as obtained pixels; if the current filtering is the last one, using the obtained pixels as candidate pixels; and if the current filtering is not the last one, providing the obtained pixels for the next filtering. Moreover, after comparing with the mean, perform exclusion procedure to keep only one of the adjacently obtained pixels and eliminate the other adjacently obtained pixels, so as to obtain the nonadjacent pixels.

Furthermore, before filtering the pixels, firstly select a color channel of the image, and subsequently filter the pixels from the pixels of the corresponding color channel.

The apparatus of recognizing image feature pixels provided by the present invention includes an image receiving end, at least one filter which is sequentially connected in series, and a feature describing module.

The image receiving end receives an image having a plurality of pixels. The filter subsequently filters the pixels of the image. At this point, the pixels are filtered through detecting each of the edge pixels of objects in the received image. A filter in the most downstream marks the candidate pixels of the image. Based on the candidate pixels output from the filter in the most downstream, the feature describing module performs multiple DOG blurring operations to find the candidate pixels having relative extreme values as a plurality of feature pixels.

At this point, each of the filters may obtain the possibly candidate pixels by comparing each pixel value to the adjacent pixel values. The pixel values may be brightness values or chroma values. The filters may be gradient filters, mean filters, or other edge detection filters. In other words, the filters may include at least one gradient filter. Furthermore, the filter also may include at least one mean filter.

The image receiving end may be a receiving endpoint or provided with a channel selecting module. The channel selecting module selects a color channel of the received image and outputs the image data of the corresponding color channel. Subsequently, filter the pixels according to the image data of the corresponding color channel.

In view of the above, the apparatus and method of recognizing image feature pixels provided by the present invention may reduce the time to perform the recognition of feature pixels, thereby speeding up the process of an image. Furthermore, the apparatus and method may efficiently enhance the systematic performance when processing a high resolution image (for example, more than 1 million pixels). Moreover, it is more likely to eliminate noises in the image through the filtering of pixels and/or the selection of color channels, thereby reducing an error rate.

BRIEF DESCRIPTION OF THE DRAWINGS

The present invention will become more fully understood from the detailed description given herein below for illustration only, and thus are not limitative of the present invention, and wherein:

FIG. 11 is a schematic view of creating a window block by using a pixel as a central point in the apparatus and the method of recognizing image feature pixels according to an embodiment of the present invention.

DETAILED DESCRIPTION OF THE INVENTION

Figure 2:
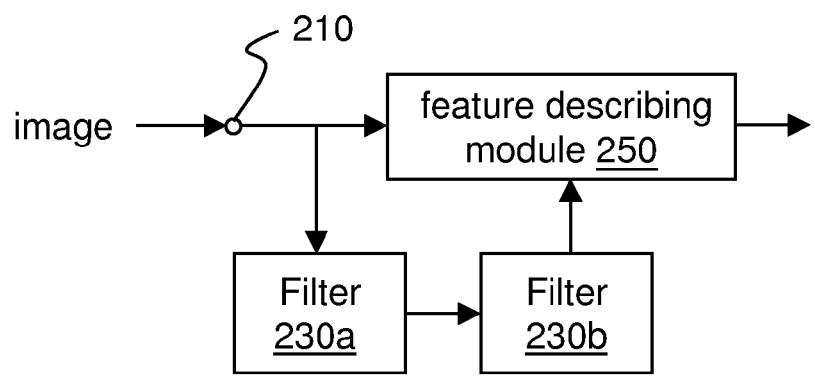
FIG. 2 is a schematic block diagram of the apparatus of recognizing image feature pixels according to an embodiment of the present invention.

Referring to FIG. 2, the apparatus of recognizing image feature pixels includes an image receiving end 210, at least one filter, and a feature describing module 250. For sake of convenient illustration, in the following embodiments, two filters 230a and 230b (both called "filter 230" hereafter) are given as an example. Alternatively, one single filter or more than two filters may also be allowed upon actual demands, for example, in consideration of cost, system capability, and/or process effects, which, however, are not for limitation. The feature describing module 250 can be implemented by one or more feature describing units.

The filters 230 are sequentially connected in series, and the filter 230a in the most upstream among the filters 230 is electrically connected to the image receiving end 210. The feature describing module 250 is electrically connected to the image receiving end 210 and the filter 230b in the most downstream among the filters 230.

Figure 1:
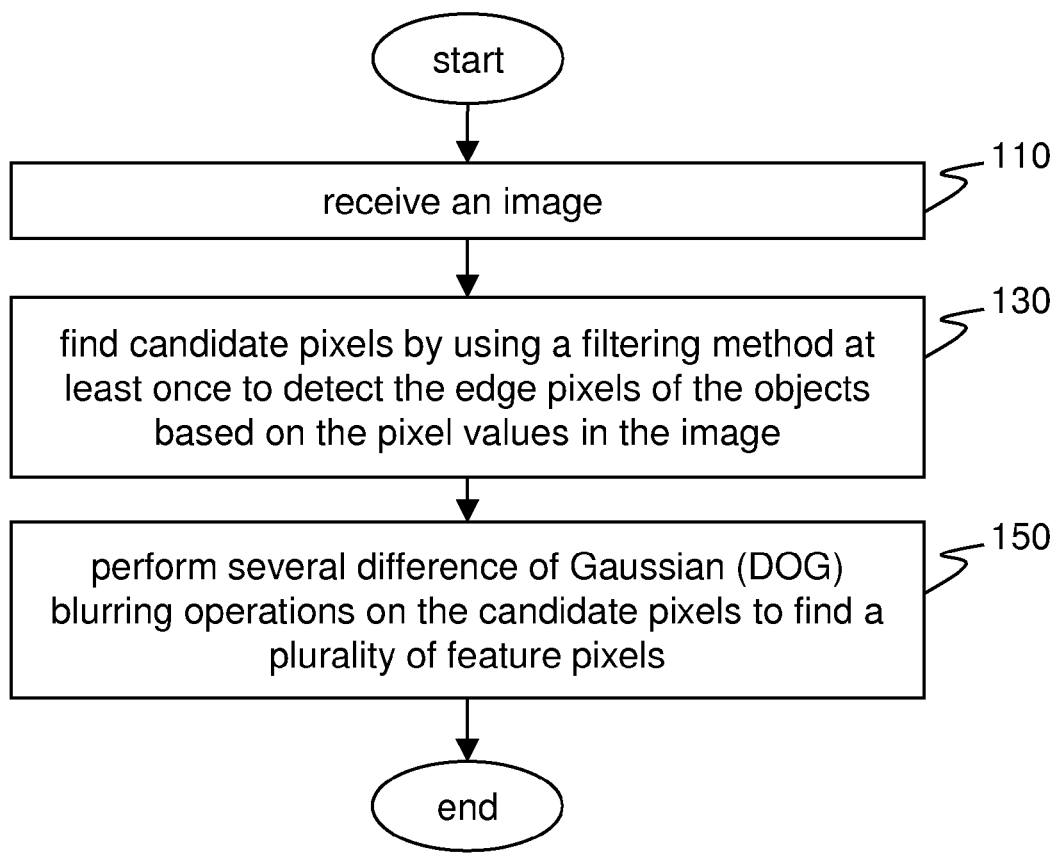
FIG. 1 is a flow chart of the method of recognizing image feature pixels according to an embodiment of the present invention.

Referring to FIG. 1, the image receiving end 210 receives an image with a plurality of pixels (Step 110).

Each of the filters 230 follows the output result of the previous element and finds candidate pixels by using a filtering method at least once to detect the edge pixels of the objects based on the pixels values in the image (Step 130). In other words, the filter 230a filters each of the pixels in the image from the image receiving end 210, while the filter 230b only filters the pixels kept by the filter 230a.

The feature describing module 250 performs the DOG blurring operations based on the candidate pixels output by the filter 230 in the most downstream, so as to treat the candidate pixels having a relative extreme value as a plurality of feature pixels (Step 150).

Figure 3:
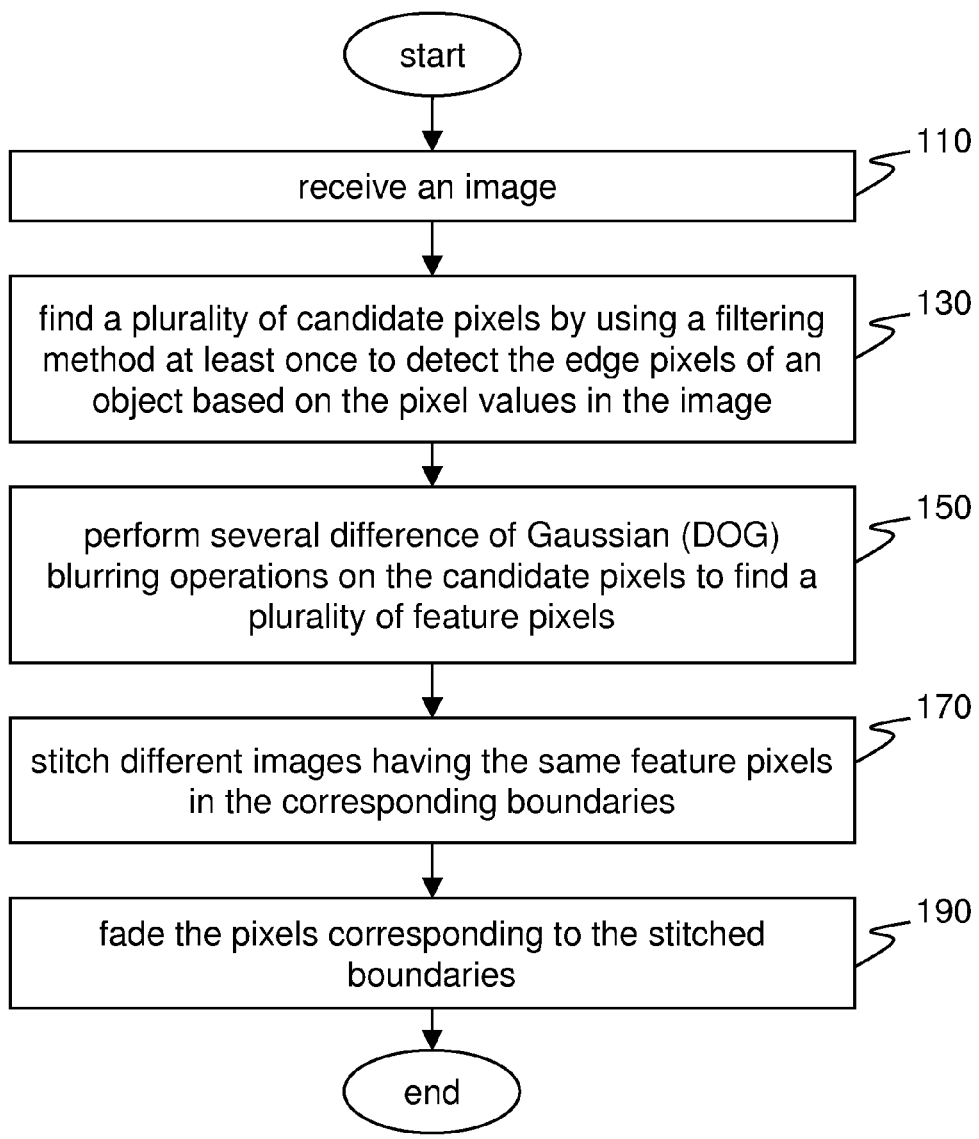
FIG. 3 is a flow chart of the method of recognizing image feature pixels according to another embodiment of the present invention.

Therefore, the obtained feature pixels may be applied in the following processing, for example, recognition of objects or stitching images to form a panorama. With regard to stitching images to form a panorama, referring to FIG. 3, after obtaining the feature pixels, stitch different images with the same feature pixels in the corresponding boundaries (Step 170), and then fade the pixels corresponding to the stitched boundaries (Step 190), thereby obtaining seamless panoramas.

Figure 4:
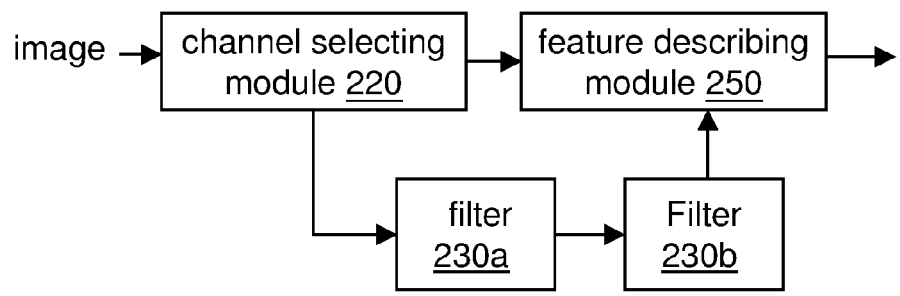
FIG. 4 is a schematic block diagram of the apparatus of recognizing image feature pixels according to another embodiment of the present invention.
Figure 5:
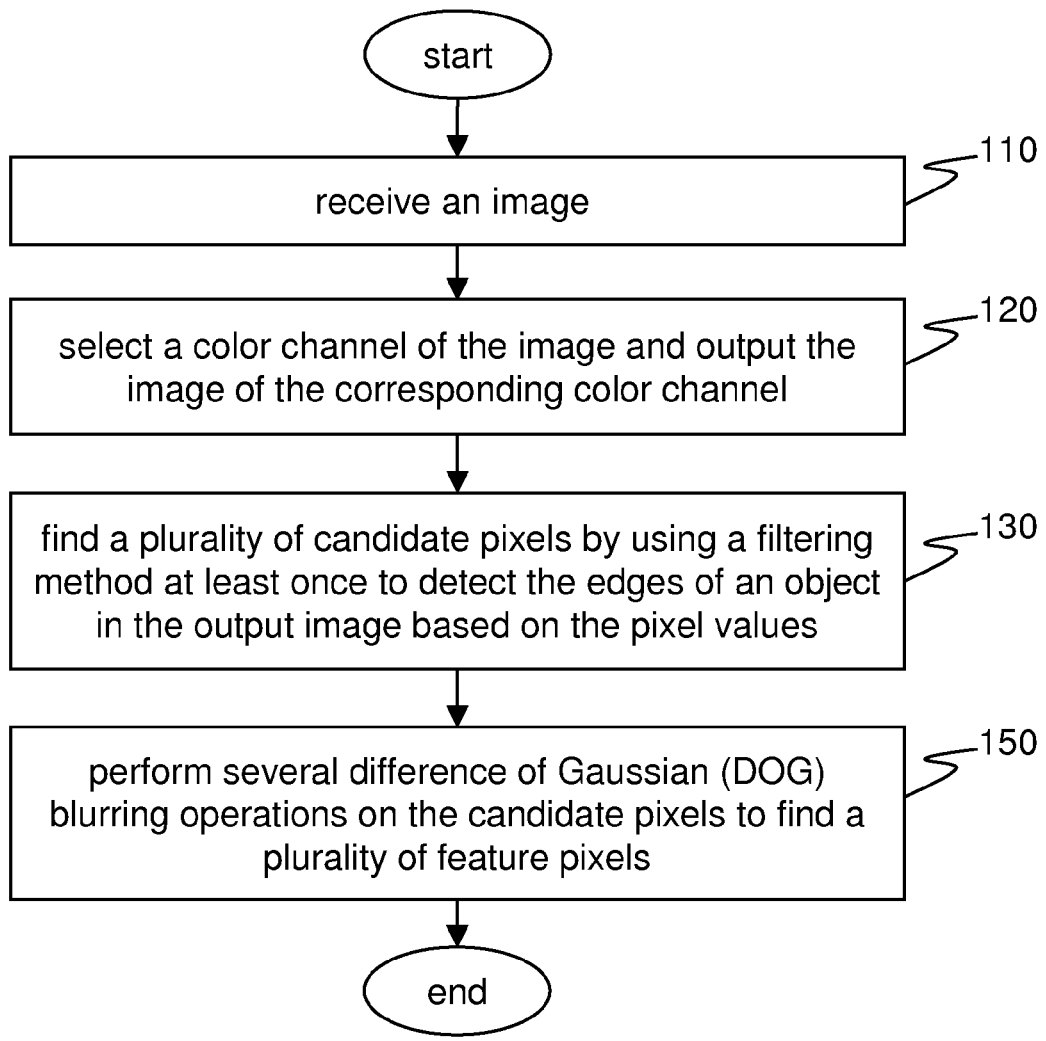
FIG. 5 is a flow chart of the method of recognizing image feature pixels according to still another embodiment of the present invention.

The image receiving end 210 may be a receiving endpoint, or may be provided with a channel selecting module 220, as shown in FIG. 4. Referring to FIG. 4, the channel selecting module 220 is electrically connected to the filter 230a in the most upstream among the filters 230 and the feature describing module 250. Then, further referring to FIG. 5, the channel selecting module 220 selects a color channel of the received image to output the image data of the corresponding color channel (Step 120), and subsequently perform the filtering method on the pixels in the image data of the corresponding color channel.

Herein, each filter may compare the pixel values of each pixel to the pixel values of the adjacent pixels. The pixel values may be brightness values or chroma values. The channel selecting module 220 can be implemented by one or more channel selectors.

For example, when the filter is in the most upstream (for example, the aforementioned 230a), the filter receives the image from the image receiving end, and compares the pixel values of each pixel one by one with the pixel values of the adjacent pixels, so as to obtain the pixels which value changes more severely than the adjacent pixels, then output the pixels having severely changed pixel values to the following filter. The following filter receives the output of the previous filter, and performs the same function as previous one, and then output further filtered pixels to the next filter. When the filter is in the most downstream(for example, the filter 230b), the filter obtain the pixels having pixel values which change more severely than the adjacent pixels, and define the filtered pixels as the candidate pixels and then output them to the next element (for example, the feature describing module 250 connected to the filter 230b).

At this point, the filters may be gradient filters or mean filters, or even may be other edge detection filters. In other words, the filters include at least one gradient filter. Furthermore, the filters may also include at least one mean filter.

Figure 6:
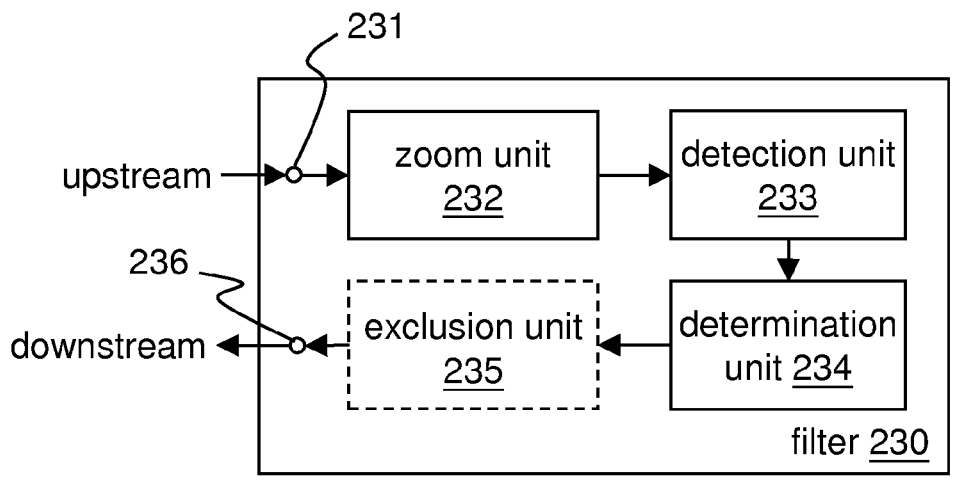
FIG. 6 is a schematic block diagram of the filter of the apparatus of recognizing image feature pixels according to an embodiment of the present invention.

Referring to FIG. 6, each of the gradient filters includes an image input end 231, a zoom unit 232, a detection unit 233, a determination unit 234, and an image output end 236.

The zoom unit 232 is electrically connected to the image input end 231, the detection unit 233 is electrically connected to the zoom unit 232, the determination unit 234 is electrically connected to the detection unit 233, and the image output end 236 is electrically connected to the determination unit 234.

Figure 7:
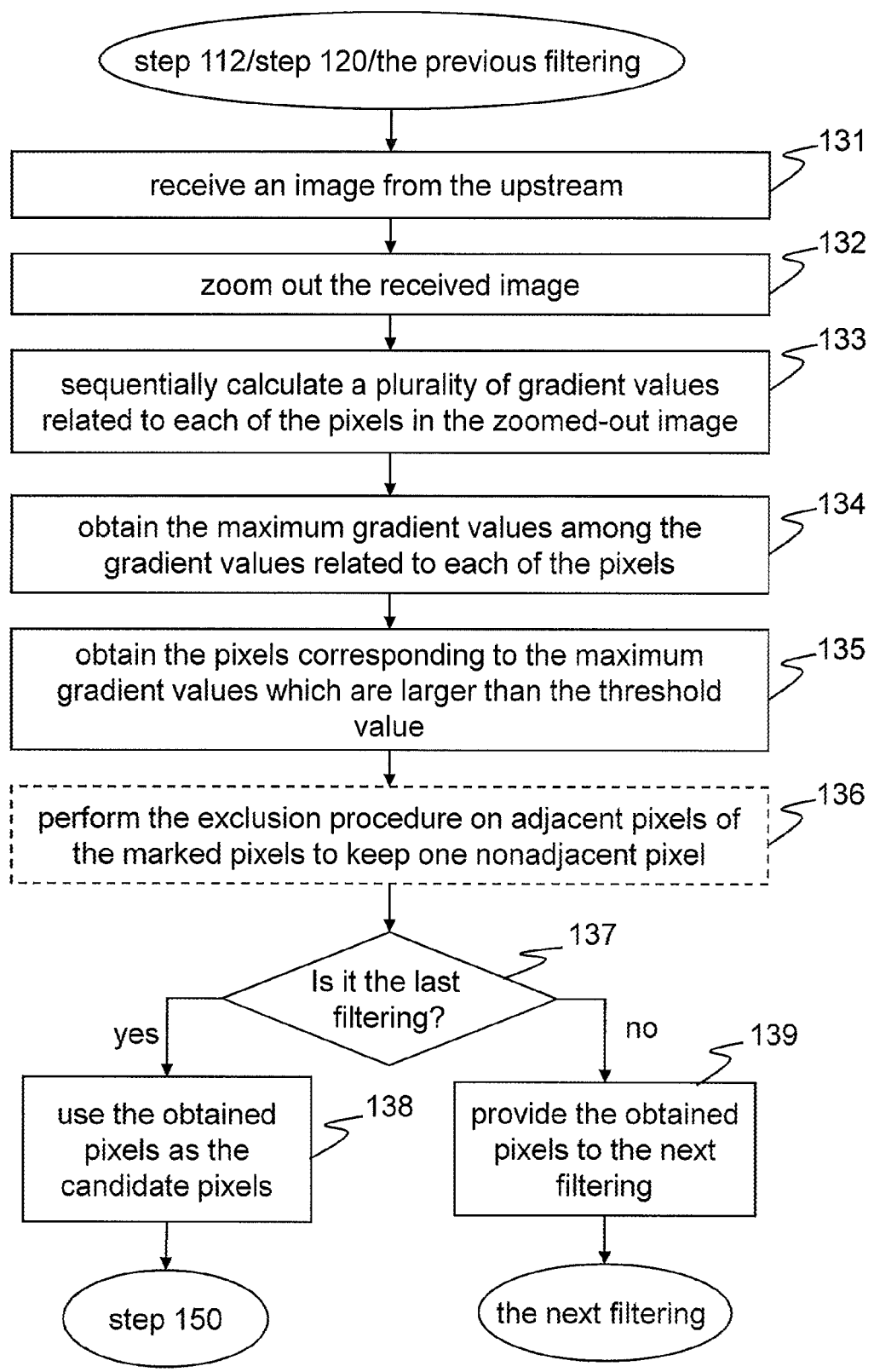
FIG. 7 is a flow chart of the method of filtering pixels in the method of recognizing image feature pixels according to an embodiment of the present invention.

Referring to FIG. 7, the image input end 231 receives an image from the upstream (Step 131). When the gradient filter is in the most upstream among the serially connected filters, the image input end 231 receives the image data from the image receiving end (for example, the receiving endpoint or the channel selecting module). When the gradient filter is not in the most upstream among the serially connected filters, the image input end 231 receives the image data from the previous filter, i.e., the result of the previous filtering performed by the previous filter.

The zoom unit 232 zooms out the image received by the image input end (Step 132). At this point, the zoom unit 232 may zoom out the image with constrain proportions by one half, one quarter, or one eighth, that is, reduce the height and width of the image with the same proportion.

The detection unit 233 sequentially calculates a plurality of gradient values related to each pixel on the zoomed-out image (Step 133), so as to obtain and then output the maximum gradient values and corresponding pixels (Step 134).

The determination unit 234 compares each of the maximum gradient values with a threshold value, so as to obtain the pixels corresponding to the maximum gradient values larger than the threshold value and define the pixels (Step 135).

The image output end 236 outputs the image having the pixels obtained by the determination unit. When the gradient filter performs the last filtering (i.e., the gradient filter is in the most downstream of the serially connected filters) (Step 137), the determination unit 234 defines the pixels corresponding to the maximum gradient values larger than the threshold value as the candidate pixels, i.e., use the obtained pixels as candidate pixels (Step 138), so as to provide them to the feature describing module. When the gradient filter does not perform the last filtering (i.e., the gradient filter is not in the most downstream among the serially connected filters) (Step 137), the image output end 236 provides the image having the pixels defined by the determination unit 234 to the next filter, and the next filter performs the next filtering on the pixels defined by the previous gradient filter (Step 139).

At this point, when the image from the upstream has defined pixels, the detection unit 233 calculates the gradient values of the defined pixels, and the determination unit 234 redefines the pixels after comparison.

The determination unit 234 marked the pixels corresponding to the maximum gradient values larger than the threshold value (Step 135). Then, an exclusion unit 235 electrically connected to the determination unit 234 performs the exclusion procedure on adjacent pixels of the marked pixels by the determination unit 234, so as to keep only one of the adjacent pixels among the marked pixels, i.e., the nonadjacent pixels (Step 136), which are then output by the image output end 236 (Step 138 or Step 139).

Figure 8:
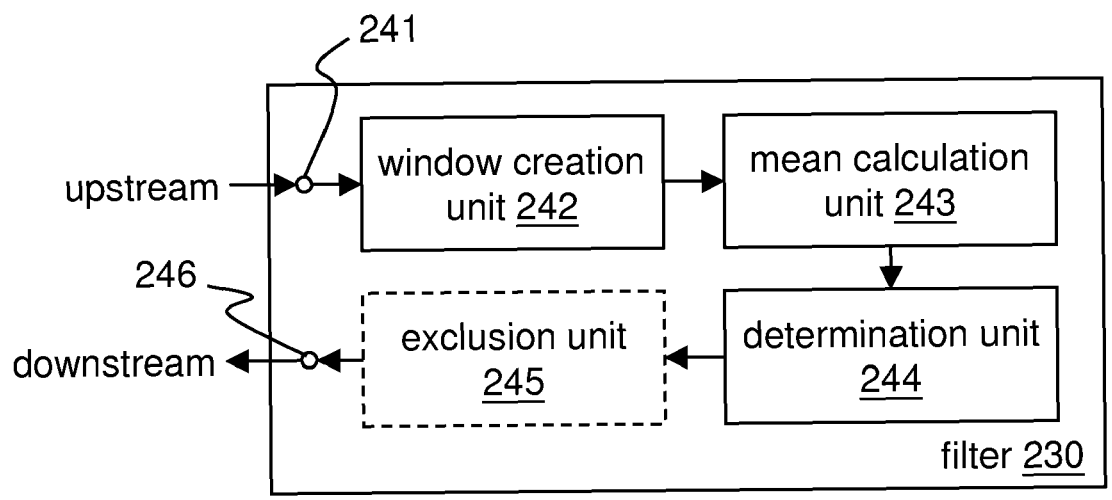
FIG. 8 is a schematic block diagram of the filter of the apparatus of recognizing image feature pixels according to another embodiment of the present invention.

Referring to FIG. 8, each mean filter includes an image input end 241, a window creation unit 242, a mean calculation unit 243, a determination unit 244, and an image output end 246.

The window creation unit 242 is electrically connected to the image input end 241, the mean calculation unit 243 is electrically connected to the window creation unit 242, the determination unit 244 is electrically connected to the mean calculation unit 243, and the image output end 246 is electrically connected to the determination unit 244.

Figure 9:
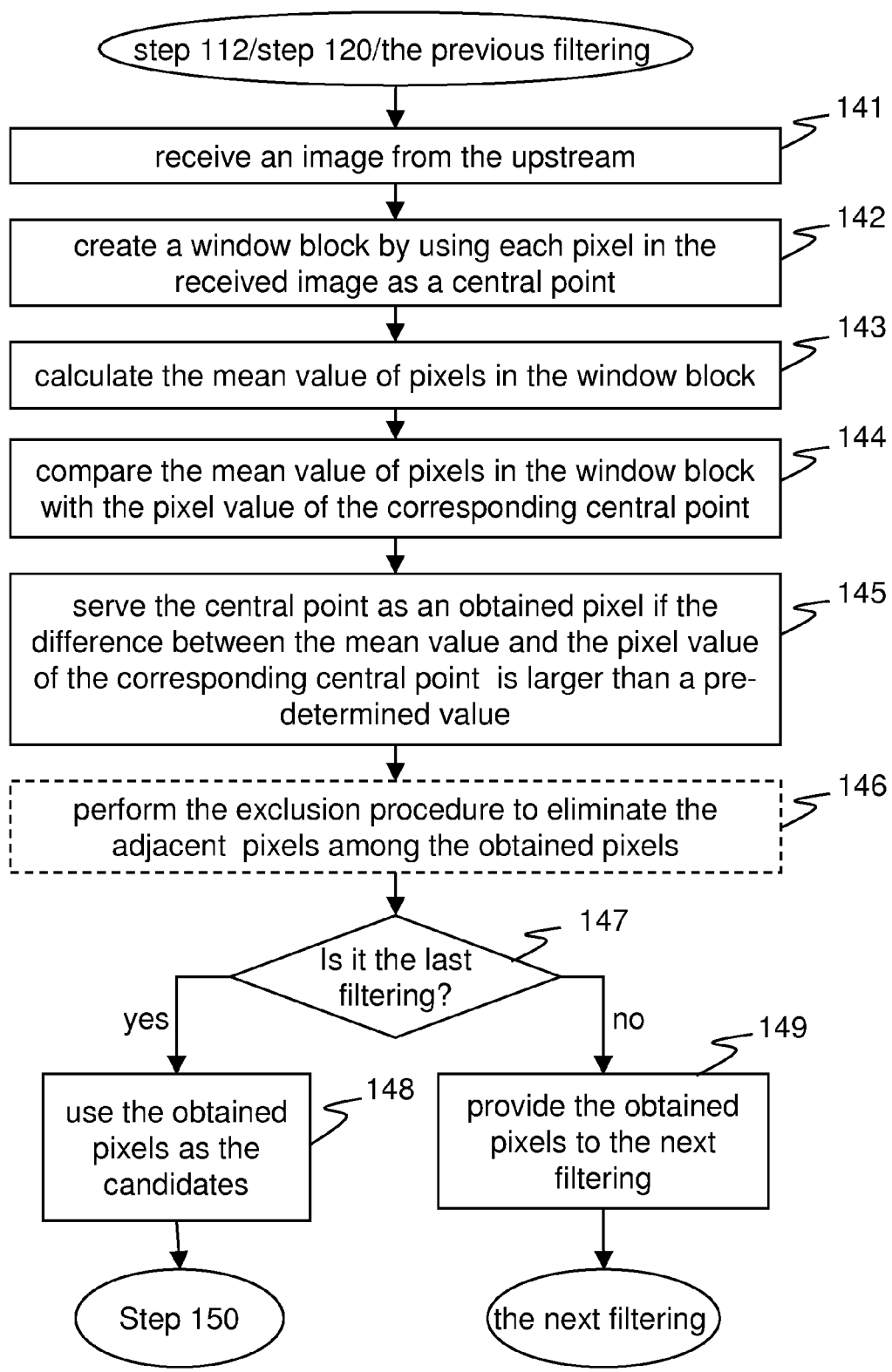
FIG. 9 is a flow chart of the method of filtering pixels in the method of recognizing image feature pixels according to another embodiment of the present invention.

Further referring to FIG. 9, the image input end 241 receives the image from the upstream (Step 141). When the mean filter is in the most upstream of the serially connected filters, the image input end 241 receives the image output from the image receiving end (for example, the receiving endpoint or the channel selecting module). When the mean filter is not in the most upstream of the serially connected filters, the image input end 241 receives the image outputted by the previous filter, i.e., receives the result of the previous filtering performed by the previous filter.

The window creation unit 242 creates a window block by using each pixel in the image received by the image input end 241 as a central point (Step 142).

The mean calculation unit 243 calculates the mean value of the pixels in the window block (Step 143).

The determination unit 244 compares the mean value of pixels in the window block with the pixel value of the corresponding central point in the window block (Step 144), so as to obtain the pixels that may serve as the candidate pixels (Step 145). At this point, the determination unit 244 finds the pixels with the pixel values having a severe difference from the mean value of pixels in the window block.

The image output end 246 outputs the image data having the pixels defined by the determination unit 244 (Step 145). When the mean filter performs the last filtering (i.e., the mean filter is in the most downstream of the serially connected filters) (Step 147), the determination unit 244 defines the obtained pixels with the pixel values having a severe difference from the mean value of the pixels in the window block as the candidate pixels (Step 148), so as to provide them to the feature describing module. When the mean filter does not perform the last filtering (i.e., the mean filter is not in the most downstream of the serially connected filters) (Step 147), the image output end 246 provides the image having the pixels defined by the determination unit 244 to the next filter, and the next filter performs the next filtering procedure on the pixels defined by the mean filter (Step 149).

Herein, when the image from the upper stream has the defined pixels, the window creation unit 242 creates a window block for the defined pixels, and the determination unit 244 redefines the pixels of the image according to the found pixels.

After the determination unit 244 finds the pixels with the pixel values having a difference with respect to the mean (Step 145), the exclusion unit 245 electrically connected to the determination unit 244 performs the exclusion procedure on t the obtained pixels, and only keeps one of the adjacent pixels among the obtained pixels, i.e., the nonadjacent pixels (Step 146), which are then output from the image output end 246 (Step 148 or Step 149).

For example, it is assumed that the channel selecting module and two filters are adopted, referring to FIG. 4, in which the filter 230a is a gradient filter and the filter 230b is a mean filter. The channel selecting module selects a Gr (green toward red after compensation) channel for the image, which is merely for illustration, and the present invention is not limited thereby. In practice, a red (R) channel, a blue (B) channel, or a Gb (green toward blue) channel may also be selected.

Figure 10:
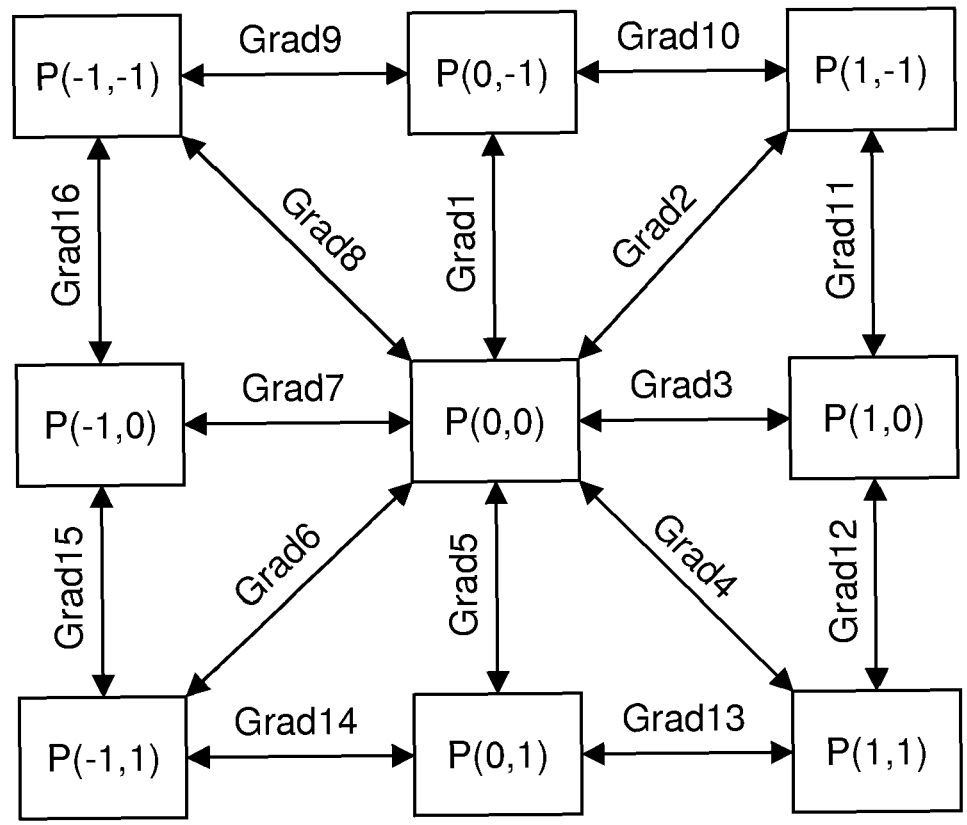
FIG. 10 is a schematic view of calculating a gradient value of a pixel in the apparatus and the method of recognizing image feature pixels according to an embodiment of the present invention.

The filter 230a firstly reduces the width and height of the image by one quarter, respectively, and then calculates the gradient values of each of the Gr pixels. Referring to FIG. 10, for example, as for the pixel point P (0,0), subtract the brightness value of the pixel point P(0,0) from the brightness values of the surrounding pixels P(−1,−1), P(0,−1), P(1,−1), P(−1,0), P(1,0), P(−1,1), P(0,1), P(1,1) and obtain the absolute values, thereby obtaining the gradient values Grad1-Grad16 and getting the maximum gradient value. Compare the maximum gradient value with a predetermined threshold value, and determine whether it is worthy to perform the following DOG blurring operation on the points in the true image region corresponding to the pixels of the maximum gradient values, i.e., whether they are feature points for the true image. Finally, define the pixels (the pixels corresponding to the maximum gradient values larger than the threshold value) determined worthy to undergo the following DOG blurring operation, and output the processed image to the next element, i.e., the filter 230b in this example.

At this point, the filter 230a may obtain the maximum gradient values (MaxGrad) in the region through the following formulas (such as formulas 1 and 2).

$$\text{MaxGrad} = \text{Max}\{\text{Grad}i\}, i \in [1\sim16] \quad \text{Formula 1}$$

$$\text{Grad}i = |P_{ia} - P_{ib}| \quad \text{Formula 2}$$

In the formulas, Pia and Pib refer to the pixel values of the two adjacent pixels, for example, Grad1=|P(0,−1)−P(0,0)|, in which P(0,−1) and P(0,0) represent the pixel values of the pixel point P(0,−1) and the pixel point P(0,0) respectively.

At this point, the gradient threshold value (Th) may be adjusted dynamically according to the overall brightness of the image. For example, the gradient threshold value (Th) may be found based on the following formula (formula 3).

$$Th_{STD} = \text{Max}\{Th_{check}\}, \quad \text{Formula 3}$$

$$Th_{check} \Rightarrow \frac{MatchingSet_i\_\text{MaxError with Filter}}{MatchingSet_i\_\text{MaxError w/o Filter}} < Th_{error}$$

Firstly set an initial gradient threshold value ($Th_{check}$), use the gradient threshold value ($Th_{check}$) to find feature points from several sets of images for the basic test, and apply the feature points for matching each of the image pairs. If the ratios of the maximum error values (MatchingSet$_i$_MaxError with Filter) of each set of matching result (MatchingSet$_i$) to the maximum error value without a filter (MatchingSet$_i$_MaxError w/o Filter) are all smaller than a predetermined error threshold value ($Th_{error}$), it is determined that the gradient threshold value is an acceptable gradient threshold value. Increase the gradient threshold value to repeatedly perform the determination action, till the maximum acceptable gradient threshold value ($Th_{STD}$) is found. After the $Th_{STD}$ is found, it may be widely used in different image sets through the following formulas (e.g., the formulas 4 and 5).

$$T = k \times Th_{STD} \quad \text{formula 4}$$

$$k = f(\text{Global\_Means}) \quad \text{formula 5}$$

f(Global_Means) refers to a mean of the pixel values of the whole image. Different values k may be generated according to the overall brightness of the image through the formula 5, and the gradient threshold value may be dynamically adjusted by using the values k.

The filter 230b continues to filter the pixels in the image according to the processing result of the filter 230a. At this point, the filter 230b may form a mask, which is a window block under a true image, for example, the 5×5 window block formed by using the pixel point P22 as a center point, as shown in FIG. 11.

The filter 230b calculates the mean value of the pixels in the window block created by the central point (P22) through the formula 7, and then determines whether the pixel value of the central point (P22) and the mean have a specific difference by using the following formulas 8 and 9 (the range of the difference is determined by α, and α is calculated from the following formula, i.e., the formula 6).

$$\alpha = \text{Max}\{\alpha_{check}\}, \quad \text{Formula 6}$$

$$\alpha_{check} \Rightarrow \frac{MatchingSet_i\_\text{MaxError with Filter}}{MatchingSet_i\_\text{MaxError w/o Filter}} < \alpha_{error}$$

Firstly set an initial mean threshold value ($\alpha_{check}$), use the mean threshold value ($\alpha_{check}$) to find feature points from several sets of images for the basic test, and apply the feature points for matching each of the image pairs. If the ratios of the maximum error values (MatchingSet$_i$_MaxError with Filter) of each set of matching result (MatchingSet$_i$) to the maximum error value without a filter (MatchingSet$_i$_MaxError w/o Filter) are all smaller than a predetermined error threshold value ($\alpha_{error}$), it is determined that the mean threshold value is an acceptable mean threshold value. Increase the mean threshold value to repeatedly perform the determination action, till the maximum acceptable mean threshold value threshold value (α) is found.

$$\text{Mean} = (P00+P02+P04+P20+P24+P40+P42+P44) \div 8 \quad \text{Formula 7}$$

$$P22 > \text{Mean} + \alpha \times P22 \quad \text{Formula 8}$$

$$P22 < \text{Mean} - \alpha \times P22 \quad \text{Formula 9}$$

In these formulas, P00, P02, P04, P20, P22, P24, P40, P42, and P44 represent the pixel values of the pixels.

In this example, although the displayed mean is the average value of some pixels except the center point in the window region, the present invention is not limited thereby. In practice, it may also be the average value of all pixels in the window region. The method of calculating the mean may be determined by the processing effect of the filter actually required.

After the filter 230b performs the aforementioned processing based on the images processed by the filter 230a, the pixels with pixel values having a specific difference from the mean value of pixels in the window block redefined by the filter 230b, so as to be provided to the feature describing module as the candidate pixels.

The feature describing module performs the DOG blurring operations based on the candidate pixels, so as to find the candidate pixels having a relative extreme value as the feature pixels.

At this point, the conventional architecture and the two test architectures (hereinafter the first test architecture and the second architecture respectively) of the apparatus of recognizing image feature pixels provided by the present invention are used to perform operation on eight images at the same time. The conventional architecture performs feature capturing and matching operation on the images merely by using the technology of scale-invariant features transform (SIFT). The first test architecture processes the images through the gradient filter, and then performs feature capturing and matching operation on the processed images by using the SIFT technology. The second test architecture processes the images through the gradient filters, and then the mean filter processes the images processed by the gradient filter. Then, the second test architecture performs image capturing and matching operation on the images processed by the mean filter by using the SIFT technology. With regard to the time of processing each of the images, the conventional architecture needs 1.45 seconds, while the first test architecture merely needs 0.35 seconds, and the second test architecture merely needs 0.26 seconds. With regard to the quantity of the misjudged pixels of each image, the conventional architecture has 1.02 pixels, the first test architecture has 1.12 pixels, and the second architecture has 1.09 pixels. With regard to the maximum quantity of the misjudged pixels of the eight images, the conventional architecture has 2.76 pixels, the first test architecture has 2.96 pixels, and the second test architecture has 2.90 pixels. According to the result, the apparatus and method of recognizing image feature pixels provided by the present invention may significantly reduce the time of processing images.

In view of the above, the apparatus and method of recognizing image feature pixels provided by the present invention may reduce the time of recognizing feature pixels, thereby further reducing the time of processing images. The system efficiency may be enhanced if the apparatus and method are applied in processing a high resolution image (for example, more than 1 million pixels).

What is claimed is:

1. A method of recognizing image feature pixels, comprising:
   receiving an image having a plurality of pixels;
   subsequent filtering of the pixels at least once by detecting edge pixels of an object in the image based on pixel values of the pixels, so as to obtain a plurality of candidate pixels;
   performing difference of Gaussian (DOG) blurring operations on the candidate pixels to find the candidate pixels each of which has a relative extreme value as a plurality of feature pixels;
   stitching different images having the same feature pixels in the corresponding boundaries to form a stitched image; and
   fading the pixels in the corresponding boundaries of the stitched image.

2. The method of recognizing image feature pixels as claimed in claim 1, wherein the step of subsequent filtering the pixels at least once is filtering the pixels through comparing a brightness value of each of the pixels with the brightness values of the adjacent pixels.

3. The method of recognizing image feature pixels as claimed in claim 1, wherein the step of subsequent filtering of the pixels at least once is filtering the pixels through comparing a chroma value of each of the pixels with the chroma values of the adjacent pixels.

4. The method of recognizing image feature pixels as claimed in claim 1, wherein the step of subsequent filtering the pixels at least once comprises:
   performing a first filtering of the pixels with the pixels of the image;
   performing a second filtering of the pixels with the pixels obtained from the first filtering; and
   using the pixels obtained from the last filtering as the candidate pixels.

5. The method of recognizing image feature pixels as claimed in claim 1, wherein the step of subsequent filtering the pixels at least once comprises:
   zooming out the image;
   sequentially calculating a plurality of gradient values related to each of the pixels of the zoomed-out image;
   obtaining the maximum gradient values among the gradient values related to each of the pixels;
   comparing each of the maximum gradient values with a threshold value, so as to obtain the pixels corresponding to the maximum gradient values larger than the threshold value;
   if the current filtering is the last one, using the obtained pixels as the candidate pixels; and
   if the current filtering is not the last one, providing the obtained pixels for the next filtering.

6. The method of recognizing image feature pixels as claimed in claim 5, wherein the step of subsequent filtering the pixels at least once further comprises:
   after comparing each of the maximum gradient values with the threshold value, performing exclusion procedure on adjacent pixels of the found pixels to keep one of the adjacent pixels, so as to obtain the nonadjacent pixels.

7. The method of recognizing image feature pixels as claimed in claim 1, wherein the step of subsequent filtering the pixels at least once comprises:
   creating a window block by using each of the pixels as a central point;
   calculating a mean of the pixel values in the window block;
   comparing the mean with the pixel value of the corresponding central point to obtain the pixel as a candidate pixel;
   if the current filtering is the last one, using the obtained pixels as the candidate pixels; and
   if the current filtering is not the last one, providing the obtained pixels to the next filtering step.

8. The method of recognizing image feature pixels as claimed in claim 7, wherein the step of subsequent filtering the pixels at least once further comprises:
   after making comparison according to the mean, performing exclusion procedure on the adjacent pixels to keep one of the adjacent pixels, so as to obtain the nonadjacent pixels.

9. The method of recognizing image feature pixels as claimed in claim 1, further comprising:
   selecting a color channel of the image to filter the following pixels corresponding to the color channel.

10. An apparatus of recognizing image feature pixels, comprising:
    an image receiving end, for receiving an image having a plurality of pixels;
    at least one filter, which is sequentially connected in series, wherein a filter in the most upstream among the filters is electrically connected to the image receiving end, and the filter is used for subsequent filtering of the pixels to detect edge of objects in the receiving image based on pixel values of the pixels, so as to obtain a plurality of candidate pixels, wherein at least one of the filter filters is a gradient filter, and each gradient filter comprises:
       an image input end, for receiving the image from the upstream filter;
       a zoom unit, electrically connected to the image input end, for zooming out the image received by the image input end;
       a detection unit, electrically connected to the zoom unit, for sequentially calculating a plurality of gradient values related to each of the pixels on the zoomed-out image and outputting the maximum gradient values among the gradient values related to each of the pixels;
       a determination unit, electrically connected to the detection unit, for comparing each of the maximum gradient values with a threshold value and marking the pixels corresponding to the maximum gradient values larger than the threshold value; and
       an image output end, electrically connected to the determination unit, for outputting the image having the pixels marked by the determination unit;
       wherein when the image from the upstream has the marked pixels, the detection unit calculates the gradient values for the marked pixels, and the determination unit remarks the pixels after comparison; and
    a feature describing module, electrically connected to the image receiving end and the filter in the most downstream among the filters, for performing difference of Gaussian (DOG) blurring operations based on the candidate pixels output from the filter in the most downstream to find the pixels each of which has a relative extreme value as a plurality of feature pixels.

11. The apparatus of recognizing image feature pixels as claimed in claim 10, wherein in at least one filter among the filters, the filter filtering the pixels based on brightness values of the pixels.

12. The apparatus of recognizing image feature pixels as claimed in claim 10, wherein in at least one filter among the filters, the filter filtering the pixels based on chroma values of the pixels.

13. The apparatus of recognizing image feature pixels as claimed in claim 10, wherein and each of the gradient filters further comprises:
   an exclusion unit, electrically connected to the determination unit, for performing exclusion procedure on adjacent pixels marked by the determination unit, so as to keep one of the adjacent pixels;
   wherein the image output end electrically connects to the exclusion unit and electrically connects to the exclusion unit via the exclusion unit, for outputting the image having the marked pixels kept by the exclusion unit.

14. The apparatus of recognizing image feature pixels as claimed in claim 10, wherein at least one filter among the filters is a mean filter, and each of the mean filters comprises:
   an image input end, for receiving the image from the upstream filter;
   a window creation unit, electrically connected to the image input end, for creating a window block by using each of the pixels in the image received by the image input end as a central point;
   a mean calculation unit, electrically connected to the window creation unit, for calculating a mean of the pixel values in the window block;
   a determination unit, electrically connected to the mean calculation unit and the window creation unit, for marking the pixels with the pixel values having a difference with respect to the mean; and
   an image output end, electrically connected to the determination unit, for outputting the image having the pixels marked by the determination unit;
   wherein the image from the upstream has the marked pixels, the window creation unit creates the window block for the marked pixels, and the determination unit remarks the pixels of the image according to the marked pixels.

15. The apparatus of recognizing image feature pixels as claimed in claim 10, wherein at least filter among the filters is a mean filter, and each of the mean filters comprises:
   an image input end, for receiving the image from the upstream filter;
   a window creation unit, electrically connected to the image input end, for creating a window block by using each of the pixels in the image received by the image input end as a central point;
   a mean calculation unit, electrically connected to the window creation unit, for calculating a mean of the pixel values in the window block;
   a determination unit, electrically connected to the mean calculation unit and the window creation unit, for marking the pixels with the pixel values having a difference with respect to the mean;
   an exclusion unit, electrically connected to the determination unit, for performing exclusion procedure on adjacent pixels in the pixels marked by the determination unit, so as to keep one of the adjacent pixels; and
   an image output end, electrically connected to the exclusion unit, for outputting the image having the marked pixels kept by the exclusion unit;
   wherein the image from the upstream has the marked pixels, the window creation unit creates the window block for the marked pixels, and the determination unit remark the pixels of the image according to the found pixels.

16. The apparatus of recognizing image feature pixels as claimed in claim 10, wherein the image receiving end comprises:
   a channel selecting module, electrically connected to the filter in the most upstream among the filters and the feature describing module, for selecting a color channel of the received image and outputting the image corresponding to the color channel.

* * * * *